United States Patent
Shintani et al.

(10) Patent No.: US 9,665,342 B2
(45) Date of Patent: May 30, 2017

(54) RADIO CLIENT TERMINAL AND RADIO SYSTEM

(71) Applicant: HONDA MOTOR CO., LTD., Minato-Ku, Tokyo (JP)

(72) Inventors: Hidekazu Shintani, Utsunomiya (JP); Nobuaki Asahara, Utsunomiya (JP); Junichiro Onaka, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/911,292

(22) PCT Filed: May 27, 2014

(86) PCT No.: PCT/JP2014/063945
§ 371 (c)(1),
(2) Date: Feb. 10, 2016

(87) PCT Pub. No.: WO2015/022797
PCT Pub. Date: Feb. 19, 2015

(65) Prior Publication Data
US 2016/0188289 A1    Jun. 30, 2016

(30) Foreign Application Priority Data
Aug. 13, 2013  (JP) .................................. 2013-168165

(51) Int. Cl.
| | |
|---|---|
| G06F 17/00 | (2006.01) |
| G06F 3/16 | (2006.01) |
| G10H 1/00 | (2006.01) |
| H04H 20/26 | (2008.01) |
| G11B 20/10 | (2006.01) |

(52) U.S. Cl.
CPC ........... *G06F 3/165* (2013.01); *G10H 1/0033* (2013.01); *G11B 20/10527* (2013.01); *H04H 20/26* (2013.01); *G10H 2220/351* (2013.01); *G10H 2240/125* (2013.01); *G11B 2020/1062* (2013.01)

(58) Field of Classification Search
CPC ........... H04M 1/6083; H04M 1/72522; H04M 1/72558
See application file for complete search history.

(56) References Cited

U.S. PATENT DOCUMENTS

| | | | |
|---|---|---|---|
| 2003/0129941 A1* | 7/2003 | Kawamata | ........... H04H 20/106 455/3.02 |
| 2006/0149398 A1 | 7/2006 | Sato et al. | |
| 2006/0156356 A1* | 7/2006 | Sato | ....................... G01C 21/00 725/89 |

FOREIGN PATENT DOCUMENTS

| | | |
|---|---|---|
| JP | 11-167388 A | 6/1999 |
| JP | 11-219191 A | 8/1999 |

(Continued)

*Primary Examiner* — Thomas Maung
(74) *Attorney, Agent, or Firm* — Carrier Blackman & Associates, P.C.; Joseph P. Carrier; Jingli Wang

(57) ABSTRACT

Provided is a radio client terminal such that a license for music distribution in a radio system is not required and such that music matching the preferences of the user can be played back at the appropriate times while audio content from a radio broadcast is being received and played back. The radio client terminal is configured so that music stored in advance in the storage unit of the radio client terminal according to the preferences of the user is played back after introductory audio from introductory audio content is output during the interval between playback of audio content and audio content.

7 Claims, 9 Drawing Sheets

(56) References Cited

FOREIGN PATENT DOCUMENTS

| JP | 2004-264360 A | 9/2004 |
|----|---------------|--------|
| JP | 2006-313619 A | 11/2006 |

* cited by examiner

FIG. 4

| SERVER STATE | | EXAMPLES OF INTRODUCTORY AUDIO TO MUSICAL PIECES | DISTRIBUTION SERVER | LOCAL STORAGE UNIT |
|---|---|---|---|---|
| NORMAL | Cga | Coming up next, we'll be moving onto some musical pieces. Please enjoy these next two songs. | AVAILABLE | AVAILABLE |
| EXCESSIVE TRAFFIC LOAD | Cgb | We apologize. The server is congested. Please enjoy these songs for a short time. | | AVAILABLE |
| SERVER TROUBLE/ INTERNET TROUBLE | Cgc | We apologize. We're unable to connect to the server. Please enjoy these songs for a short time. | | AVAILABLE |
| INSUFFICIENT AUDIO CONTENT | Cgd | That brings to a close today's discussion. From here on out, please enjoy the following songs. We look forward to meeting with you again tomorrow. This is DJ (Disk Jockey) ** signing off. | AVAILABLE | AVAILABLE |

55 / Cg

RADIO CLIENT TERMINAL AND RADIO SYSTEM

TECHNICAL FIELD

The present invention relates to a radio system and a client terminal applied to the radio system, the radio system being constituted from the radio client terminal, which receives and plays back audio content of a radio broadcast, and a distribution server that distributes such audio content.

BACKGROUND ART

In recent years, a radio system, which is made up from a distribution server (also referred to as a radio server) that distributes program content similar to radio broadcasts through the Internet, and a radio client terminal (music playback device) that receives the program content supplied through the Internet from the distribution server, has been put to practical use (see, Japanese Laid-Open Patent Publication No. 2004-264360, paragraphs [0016] and [0017]).

With such a radio system, in addition to the radio server, the music distribution server also is connected to the Internet, such that when the radio client terminal receives an arbitrary musical piece from the radio server, by performing a predetermined operation in the radio client terminal, musical piece information during reception thereof, or stated otherwise, musical piece information during distribution thereof from the radio server, is transmitted from the radio server to the radio client terminal.

In addition, when an operation is performed in the radio client terminal to the effect of requesting a download with respect to the music distribution server, musical pieces (data) according to the musical piece information are downloaded from the music distribution server to the radio client terminal (refer to the abstract of Japanese Laid-Open Patent Publication No. 2004-264360).

SUMMARY OF INVENTION

With the radio system according to the above-described conventional technology, from among musical pieces (data) that are transmitted by radio broadcast from the radio server and played back at the radio client terminal of a user, the user is able to download a desired musical piece from the music distribution server to the radio client terminal of the user.

However, with the radio system according to the above-described conventional technology, there is a problem in that a license contract is required for distributing the musical pieces, leading to a rise in costs. Additionally, so long as musical pieces preferred by the user are not transmitted (distributed) from the radio server, a problem also exists in that such preferred musical pieces cannot be downloaded from the music distribution server. Further still, with the radio system according to the above-described conventional technology, when trouble with the network occurs, for example, the radio client terminal is rendered silent, and playback of musical pieces becomes impossible.

The present invention has been devised with the aim of completely solving the various problems mentioned above, and has the object of providing a radio client terminal and a radio system in which costs can be reduced by rendering unnecessary a licensing contract for musical piece distribution in the radio system, while additionally, musical pieces preferred by the user can be played back at an appropriate time during reception and playback of audio content from a radio broadcast, and furthermore, as the need therefor arises, musical pieces preferred by the user can also be played back continuously even during times of trouble with the network.

A radio client terminal according to the present invention receives and plays back audio content of a radio broadcast from an external source, comprising an audio content receiver configured to receive the audio content, a musical piece storage unit configured to store beforehand musical pieces, and a playback controller configured to select and play back the audio content or the musical piece, wherein the playback controller is configured to select and play back the musical piece that has been stored beforehand in the musical piece storage unit, in between playbacks of the audio content.

According to the present invention, a configuration is provided in which (one or a plurality of) musical pieces, which have been stored beforehand in the musical piece storage unit of the radio client terminal, are selected, and the selected musical piece is played back in between the playbacks of (one or a plurality of) audio content items and (one or a plurality of) audio content items from a radio broadcast. Thus, there is no need for a license contract for distribution of musical pieces in the radio system, and costs for such a license contract can be reduced. In addition, musical pieces preferred by the user can be played back at an appropriate time during reception and playback of audio content from the radio broadcast.

In this case, the playback controller is configured to request distribution of the audio content from the external source, and select and play back the musical piece that has been stored beforehand in the musical piece storage unit, at a time that reception and playback of the requested audio content is completed. Thus, when reception and playback of the audio content responsive to the request (preference) of the user is completed, the musical piece preferred by the user can be played back without fail.

Further, the playback controller is configured to receive introductory audio content to be introduced into playback of the musical piece from the external source, and after having played back the introductory audio content, the playback controller is configured to select and play back the musical piece that has been stored beforehand in the musical piece storage unit. Accordingly, in the same manner as a conventional radio broadcast, the user can listen to preferred musical pieces naturally and without any sense of discomfort.

Moreover, at a time that the audio content cannot be received, by the playback controller selecting and playing back the musical piece that has been stored beforehand in the musical piece storage unit, even if network trouble occurs, a musical piece preferred by the user can be played back continuously and reliably.

Further, a configuration is provided in which the musical piece storage unit is configured to store beforehand introductory audio content to be introduced into playback of the musical piece, and when the audio content cannot be received, the playback controller is configured to play back the introductory audio content, which has been read out from the musical piece storage unit, into playback of the musical piece, and thereafter, select and play back the musical piece that has been stored beforehand in the musical piece storage unit. Therefore, the user can listen to the user's preferred musical piece naturally and without any sense of discomfort, even at times that network trouble occurs.

A configuration can also be provided in which reception of audio content from the external source is resumed when playback of the musical piece that has been stored beforehand in the musical piece storage unit is completed.

A radio system according to the present invention is constituted from a distribution server that distributes audio content of a radio broadcast, and a radio client terminal, which receives and plays back the audio content. The distribution server comprises an audio content storage unit configured to store the audio content, and an audio content distribution unit configured to distribute the audio content to the radio client terminal. The radio client terminal comprises an audio content receiver configured to receive the audio content, a musical piece storage unit configured to store beforehand musical pieces, and a playback controller configured to select and play back the audio content or the musical piece. The playback controller is configured to select and play back the musical piece that has been stored beforehand in the musical piece storage unit, in between playbacks of the audio content.

According to the present invention, since a configuration is provided in which musical piece, which has been stored beforehand in the musical piece storage unit of the radio client terminal, is selected, and the selected musical piece is played back in between the playbacks of audio content from a radio broadcast, there is no need for a license contract for distribution of the musical pieces in the radio system, and costs for such a license contract can be reduced. In addition, a musical piece preferred by the user can be played back at an appropriate time during reception and playback of audio content from the radio broadcast, and an effect is realized in that, even if network trouble occurs, a musical piece preferred by the user can be played back continuously.

If a vehicular radio system is configured such that the radio client terminal according to any one of the inventions described above is connected to a vehicle terminal, and the vehicular radio system outputs from a vehicle speaker the audio content or the musical piece, then a user who is an occupant such as a driver of the vehicle or the like can view and listen to a preferred musical piece on a wider screen and with clearer audio, in comparison with a general type of radio client terminal.

According to the present invention, an advantage is achieved in that, since a configuration is provided in which a musical piece, which has been stored beforehand in the musical piece storage unit of the radio client terminal, is selected, and the selected musical piece is played back in between the playbacks of audio content from a radio broadcast, there is no need for a license contract for distribution of the musical piece in the radio system, and costs for such a license contract can be reduced.

More specifically, according to the present invention, a license contract for distribution of a musical piece is rendered unnecessary, and providing such a musical piece can be realized at a reduced cost.

In addition, a musical piece preferred by the user can be played back at an appropriate time during reception and playback of audio content from the radio broadcast.

In this manner, according to the present invention, it is possible to provide a musical piece, which is routinely preferred by the user, in the sense of being tailored in the form of a radio broadcast.

Moreover, responsive to the needs of the user, even if network trouble occurs, a musical piece preferred by the user can be played back continuously.

BRIEF DESCRIPTION OF DRAWINGS

FIG. 4 is a selection table of introductory audio content;

DESCRIPTION OF EMBODIMENTS

Preferred embodiments of a radio client terminal and a radio system according to the present invention will be described in detail below with reference to the accompanying drawings.

Figure 1:
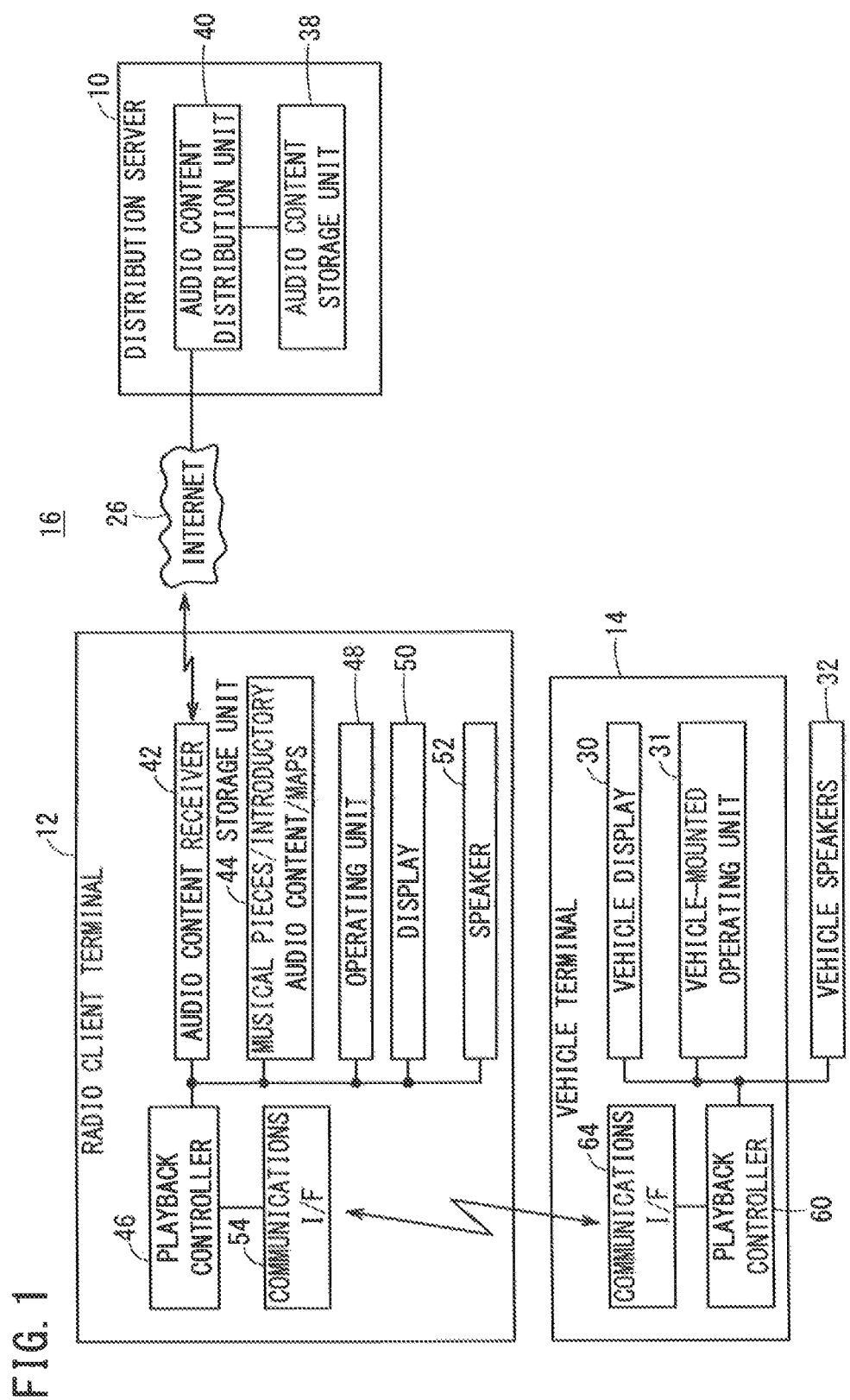
FIG. 1 is a block diagram illustrating in outline the configuration of a radio system according to an embodiment of the present invention.

FIG. 1 is a block diagram showing the configuration of a radio system 16 according to an embodiment of the present invention, which is constituted from a distribution server 10 that distributes audio content of a radio broadcast, a radio client terminal (hereinafter referred to simply as a client terminal) 12 according to the embodiment for receiving and playing back the audio content, and a vehicle terminal 14 that is connected to the client terminal 12.

According to the embodiment, as the client terminal 12, although a smart phone in which an Internet radio application has been installed is used, a dedicated Internet radio component, in which the Internet radio application (hereinafter referred to simply as an application or app) is installed, can also be used.

Figure 2:
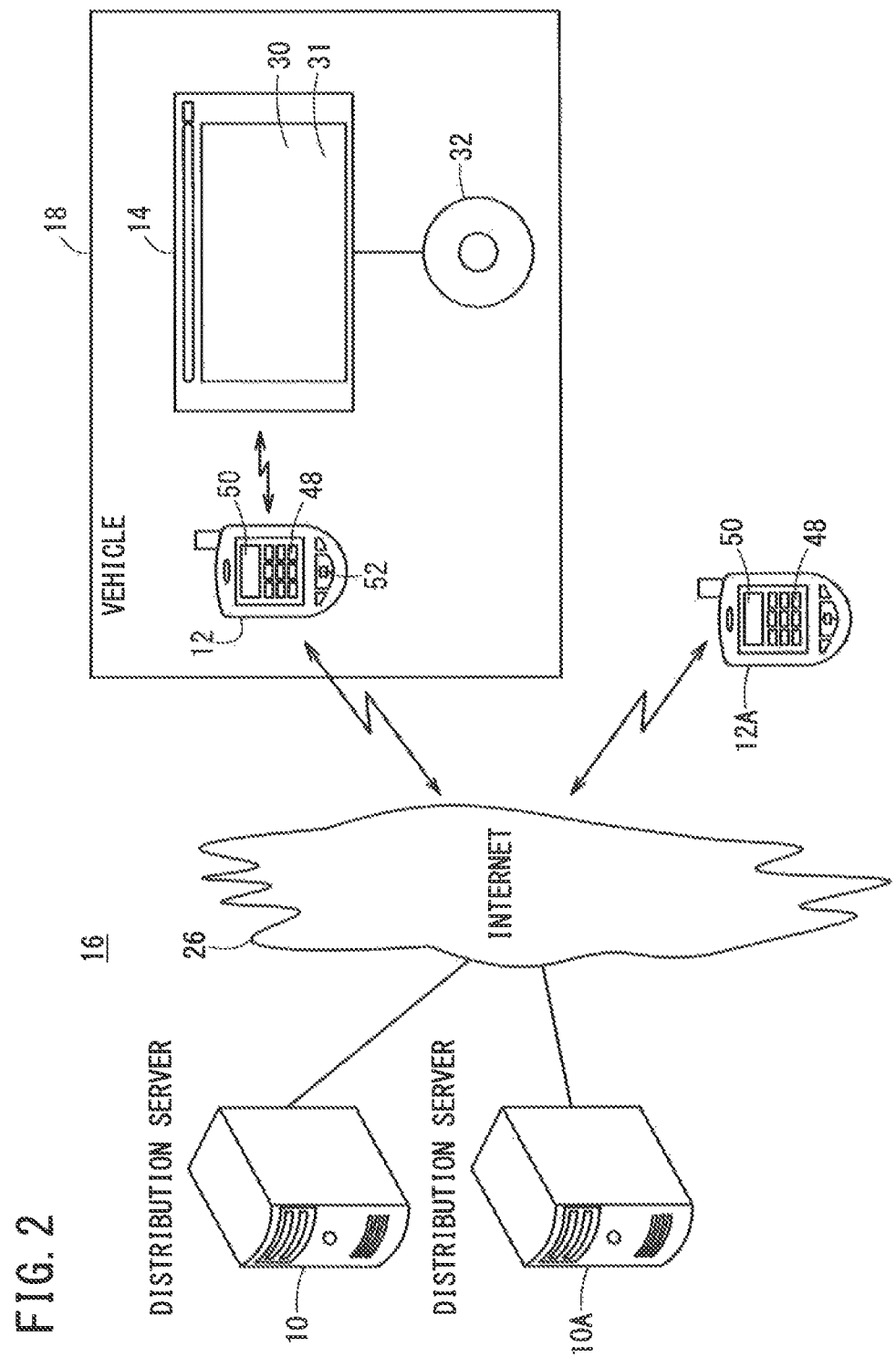
FIG. 2 is a schematic block diagram of the radio system shown in FIG. 1.

FIG. 2 is a schematic block diagram showing a more general configuration of the radio system 16.

Figure 3:
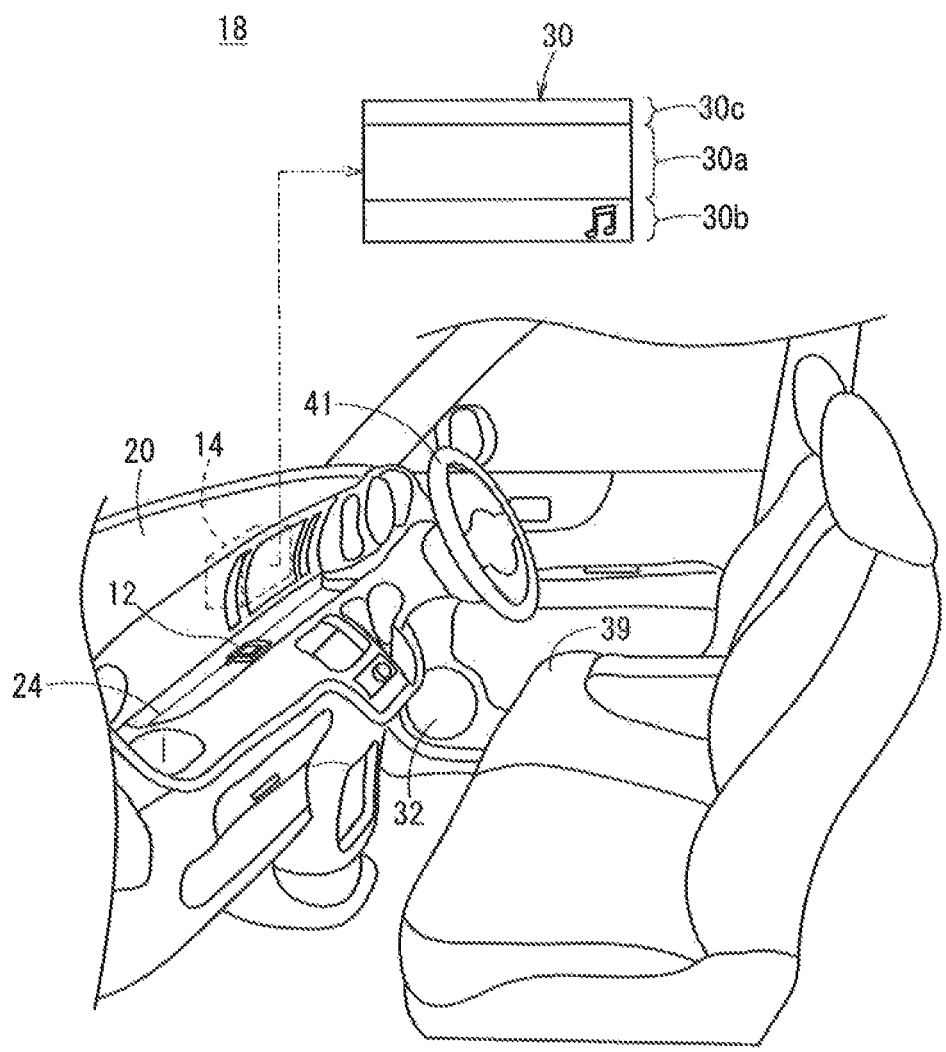
FIG. 3 is an interior schematic diagram showing a vehicle terminal that is installed in a vehicle dashboard.

FIG. 3 is an interior schematic view showing the vehicle terminal 14 in the shape of a rectangular parallelepiped, which is installed in a dashboard 20 of a vehicle 18, and a client terminal 12, which has been placed on a dashboard tray 24 by a user such as a driver or the like.

As shown in FIG. 2, in the radio system 16, a client terminal 12, which is brought into the vehicle 18 by the user, and a client terminal 12A, which is carried by the user outside of the vehicle 18, are connected with respect to distribution servers 10, 10A through the Internet 26 that serves as a network. In this manner, the client terminals 12, 12A are capable of being connected to the vehicle terminal 14 and used as the client terminal 12, and also are capable of being used independently as the client terminal 12A outside of the vehicle 18. Of course, the client terminal 12 can be used inside the vehicle 18 without being connected to the vehicle terminal 14.

Below, an exemplary case will be described of the distribution server 10, which is connected through the Internet 26, and the client terminal 12, which is brought into the vehicle 18 and connected to the vehicle terminal 14.

The vehicle terminal 14, which serves as a vehicle display and audio playback device that is connected to the client terminal 12 inside of the vehicle 18 shown in FIG. 2, is equipped with a vehicle display 30, which serves as a display unit, and is connected to vehicle speakers 32 that function as an audio output device. The vehicle display 30 doubles as a touch panel type of vehicle-mounted operating unit 31.

As shown in FIG. 3, the vehicle display 30 is arranged on a front surface portion of a casing of the vehicle terminal 14, and the vehicle speakers 32 are mounted in kick panels or the like on both sides of the front doors. In the present embodiment, the vehicle 18 is a right-hand steered vehicle, and the vehicle display 30 is arranged in a generally central position of the dashboard 20 extending horizontally, such that touch operations and slide-flick operations, etc., can be implemented by fingertips of the left hand, when taken away from a handle 41, of a driver (not shown) who is seated in a driver's seat 39. The vehicle terminal 14 is referred to as a display audio device or the like.

In the radio system 16 shown in FIG. 1, the distribution server 10 is constituted from an audio content storage unit 38, which is a storage device that stores audio content therein, and an audio content distribution unit 40, which is a control apparatus (computer) for distributing to the client terminal 12 audio content, which is streaming data that are stored in the audio content storage unit 38.

Within the audio content, there are stored audio content (referred to as audio content Ca), which is audio content in the form of a plurality of so-called broadcast programs (programs), and introductory audio content (referred to as introductory audio content Cg) that serves as introductory content, as will be discussed later. The audio content Ca and the introductory audio content Cg will be referred to collectively as audio content Cv.

In this case, the audio content distribution unit 40 includes both a streaming distribution function and an audio content management function.

On the other hand, the client terminal 12 basically comprises an audio content receiver 42 that receives the audio content Cv (the audio content Ca and the introductory audio content Cg) transmitted from the distribution server 10 through the Internet 26, a storage unit 44 which is used as a musical piece storage unit or the like for storing musical pieces Md (musical piece data) beforehand in the client terminal 12, and a playback controller 46 as a control device (computer) that selects and plays back the audio content Cv (Ca or Cg) or the musical pieces Md. In the storage unit 44 of the client terminal 12, there also are stored maps, and the client terminal 12 includes a map displaying function in conjunction with a non-illustrated internal GPS device (position specifying device).

In the playback controller 46, in addition to a playback function for playing back streaming data received from the audio content receiver 42, there also is installed beforehand an Internet radio application (a so-called app) including a playback function for playing back the musical pieces Md and the introductory audio content Cg that are stored in the storage unit 44.

In accordance with the app, in particular, the playback controller 46 selects and plays back the musical pieces Md, which have been stored beforehand in the storage unit 44, in between playbacks of the audio content Ca. Further, the playback controller 46 receives from the distribution server 10 the introductory audio content Cg to be introduced into playback of the musical pieces, and after having played back the introductory audio content Cg, selects and plays back the musical pieces Md that are stored in the storage unit 44. Furthermore, the playback controller 46 includes various functions, such as a function for selecting and playing back predetermined introductory audio content Cg and musical pieces Md, which have previously been stored in the storage unit 44, at a time that audio content Ca from the distribution server 10 cannot be received.

FIG. 4 illustrates an introductory audio content selection chart 55 indicating a corresponding relationship between the introductory audio [introductory audio content Cg (Cga to Cgd)] to introduce the musical pieces Md, and states of the distribution server 10 and transmission states of the distribution server 10 (referred to as server states). According to the present embodiment, the introductory audio content selection chart 55 including the introductory audio content Cg (Cga to Cgd) is distributed from the distribution server 10 and is stored in the storage unit 44 (in FIG. 4, a local storage unit is described), however, such information may also be stored in advance in the storage unit 44 from the above-described application. In particular, the introductory audio content Cgb and Cgc presume cases in which a connection cannot be made to the distribution server 10, and therefore, such introductory audio content Cgb, Cgc is stored beforehand from the above-described application.

In the introductory audio content selection chart 55, under a "Normal" server condition, there is presented as an example of content of the introductory audio content Cg (Cg=Cga) the phrase, "Coming up next, we'll be moving onto some musical pieces. Please enjoy these next two songs." As discussed above, the introductory audio content Cga is stored beforehand in the audio content storage unit 38 of the distribution server 10, and as necessary, is transmitted in advance and stored in the storage unit 44 (local storage unit) of the client terminal 12.

Under an "Excessive Traffic Load" server condition, there is presented as an example of content of the introductory audio content Cg (Cg=Cgb) the phrase, "We apologize. The server is congested. Please enjoy these songs for a short time." Such introductory audio content Cgb is stored beforehand in the storage unit 44 of the client terminal 12.

Under a "Server Trouble/Internet Trouble" server condition, there is presented as an example of content of the introductory audio content Cg (Cg=Cgc) the phrase, "We apologize. We're unable to connect to the server. Please enjoy these songs for a short time." Such introductory audio content Cgc is stored beforehand in the storage unit 44 of the client terminal 12.

Under an "Insufficient Audio Content" server condition, there is presented as an example of content of the introductory audio content Cg (Cg=Cgd) the phrase, "That brings to a close today's discussion. From here on out, please enjoy the following songs. We look forward to meeting with you again tomorrow. This is DJ (Disk Jockey) ** signing off." The introductory audio content Cgd is stored beforehand in the audio content storage unit 38 of the distribution server 10, and as necessary, is stored in advance in the storage unit 44 of the client terminal 12.

The introductory audio content Cg is spoken content from a so-called DJ. Voices of a plurality of people are stored in the application, and as will be described later, the indication DJ ( indicates a personal name) can be selected by the user.

Once again, returning to FIG. 1, the client terminal 12 is further equipped with an operating unit 48 constituted from a touch panel or the like controlled by the playback controller 46, a display 50 that serves as a display unit, a speaker 52 that serves as an audio output unit, and a communications interface 54, which includes a Bluetooth (registered trademark) function or the like as a short distance wireless communications interface.

The vehicle terminal 14 comprises a playback controller 60, a communications interface 64, which is connected to the playback controller 60 for communicating with the communications interface 54 of the client terminal 12, and the aforementioned vehicle display 30 and the vehicle-mounted operating unit 31. Playback (sound output) of the vehicle speakers 32 is controlled by the playback controller 60. Further, the connection between the vehicle terminal 14 and the client terminal 12 may be a wired connection in which a USB (Universal Serial Bus) or an HDMI (registered trademark) type of connector is used.

When the client terminal 12 is connected to the vehicle terminal 14 through the communications interfaces 54, 64, the playback controller 46 of the client terminal 12, while setting the playback controller 60 of the vehicle terminal 14 as a relay point, carries out displays on the vehicle display 30, and audio playback through the vehicle speakers 32, in response to operations made on the vehicle-mounted operating unit 31 of the vehicle terminal 14.

In the present embodiment, for facilitating understanding, the operating unit 48 and the display 50 of the client terminal 12, and the vehicle-mounted operating unit 31 and the vehicle display 30 of the vehicle terminal 14 are illustrated in the same manner. For example, as shown in FIG. 3, basically, a central portion, which occupies the majority of the screen, is allocated to a map and operations screen (a map screen and an operations screen) 30a on which there are displayed maps (the maps stored in the storage unit 44 of the client terminal 12) or an operations guide, a lower portion of the screen is allocated to an icon display screen 30b in which icons (described later) are displayed that are changed in accordance with the content and the playback state, and the upper portion of the screen is allocated to a title display screen 30c.

The vehicle terminal 14 also is capable of displaying maps on the map and operations screen 30a of the vehicle display 30, by way of the map display function of the client terminal 12. In actuality, although the screen that is displayed on the vertically elongate display 50 of the client terminal 12 is first rotated 90° and then screen-displayed on the horizontally elongate vehicle display 30, in order to avoid complexity, the screen that is displayed on the display 50 of the client terminal 12 will be described as the same as that which is screen-displayed on the vehicle display 30 of the vehicle terminal 14.

Figure 5:
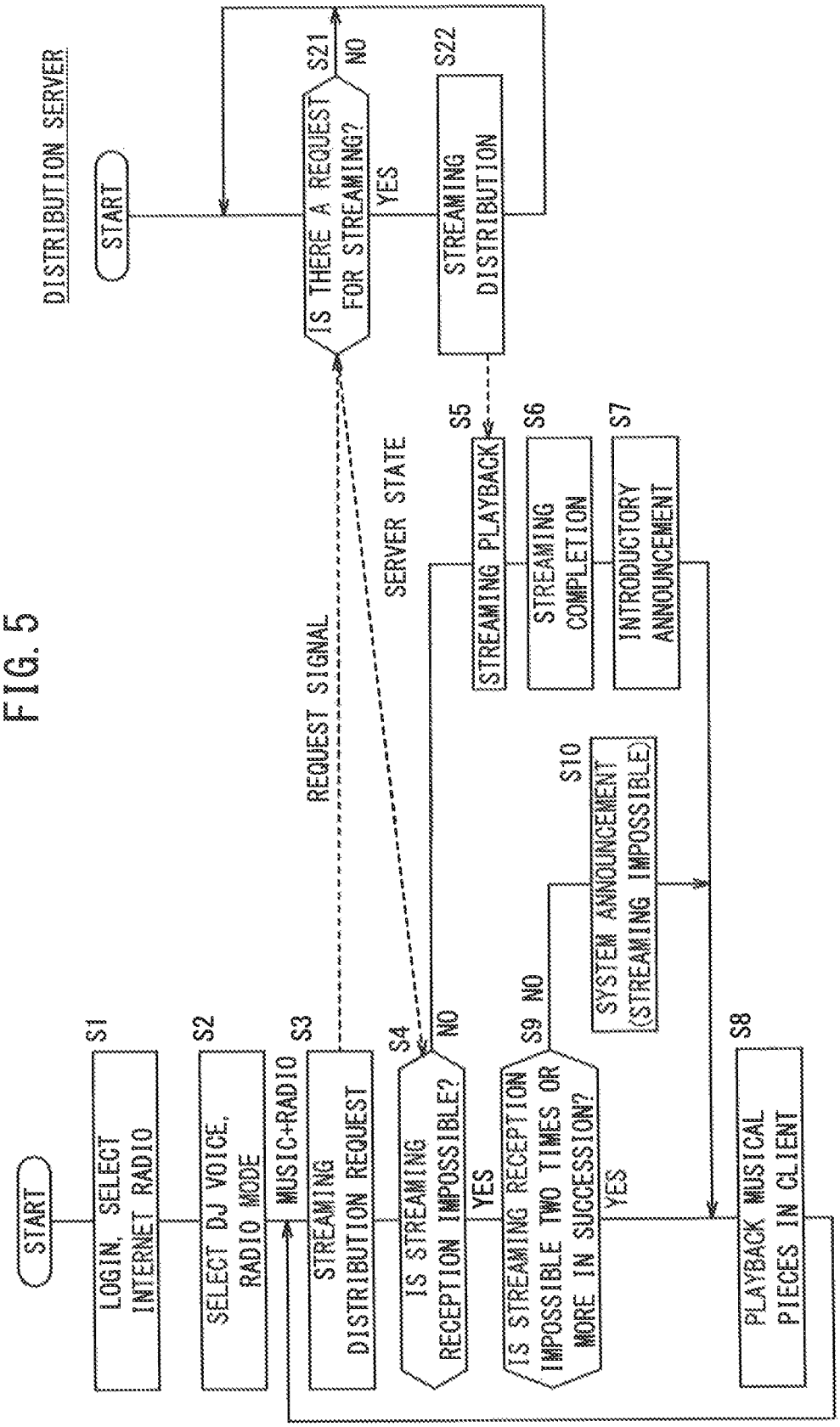
FIG. 5 is a combined sequence flow diagram and flowchart used for describing operations of a radio system according to the embodiment.

Operations of the radio system 16 according to the present embodiment, which is constructed basically in the manner described above, will next be described with reference to the combined sequence flow diagram and flowchart shown in FIG. 5.

The execution object of the program according to the flowchart on the side of the client terminal 12 (vehicle terminal 14) is the playback controller 46 of the client terminal 12, whereas the execution object of the program according to the flowchart on the side of the distribution server 10 is the audio content distribution unit 40 of the distribution server 10.

Figure 6:
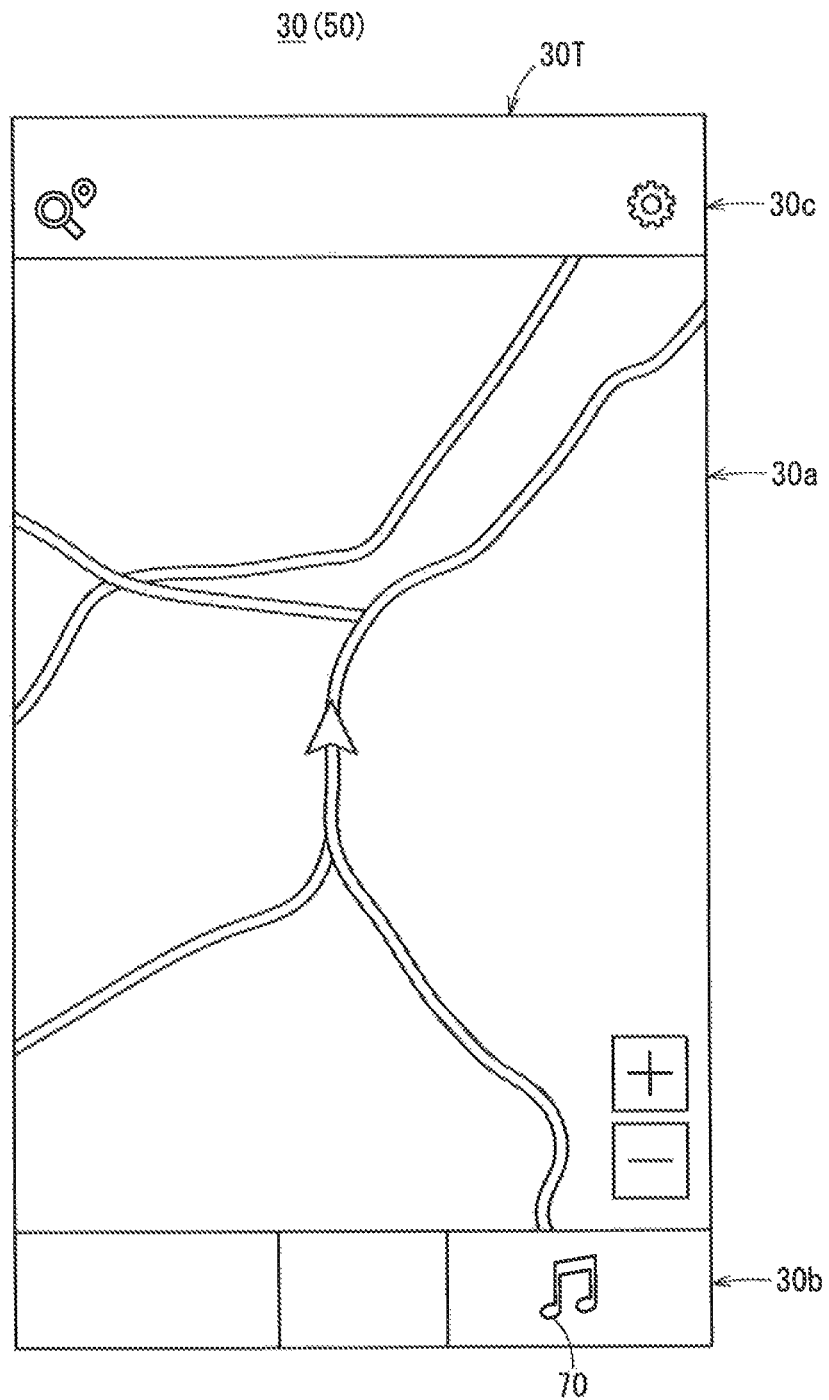
FIG. 6 is an explanatory diagram showing a top screen of a client terminal (vehicle terminal)

In step S1, when the playback controller 46 detects that a login has been made to the Internet radio application by a predetermined touch operation on the vehicle-mounted operating unit 31 of the vehicle terminal 14, as shown in FIG. 6, there is displayed on the vehicle display 30 a top screen 30T, which is made up from the map and operations screen 30a centered about the current position, the icon display screen 30b, and the title display screen 30c.

Figure 7:
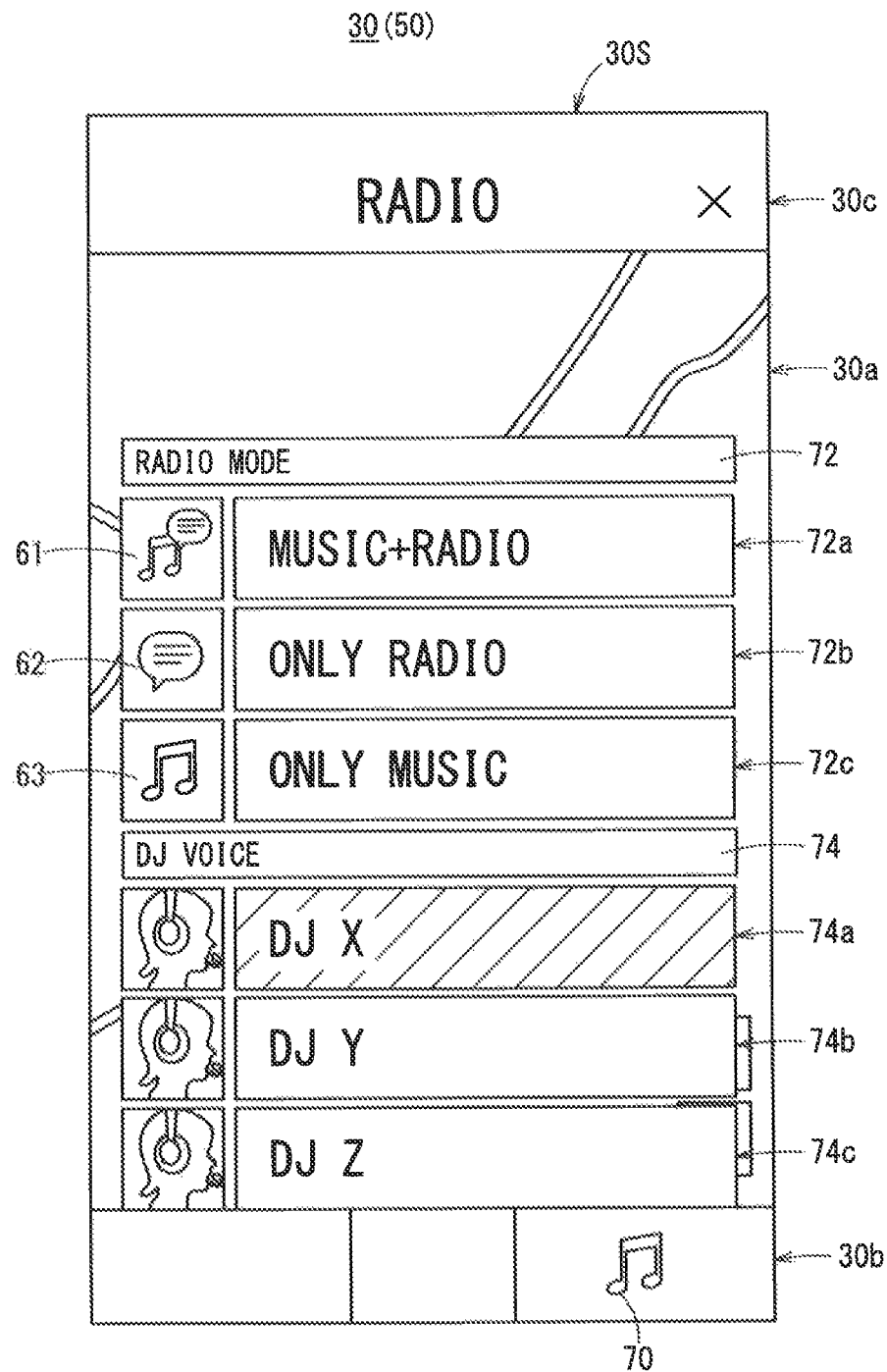
FIG. 7 is an explanatory diagram showing a streaming setting screen of a client terminal (vehicle terminal)

Further, in step S1, when it is detected that the user has touched a musical note icon 70 that is displayed in the center of the icon display screen 30b on the top screen 30T, the Internet radio is selected, and the playback controller 46 displays a streaming setting screen 30S shown in FIG. 7.

On the streaming setting screen 30S, there are displayed a selection screen 74 for a "DJ Voice" (voice of the disk jockey), and a selection screen 72 for a "Radio Mode".

With the "DJ Voice" selection screen 74, selection screens 74a to 74c for a total of three persons, i.e., a selection screen 74a for DJ X, a selection screen 74b for DJ Y, and a selection screen 74c for DJ Z, are displayed. In step S2, for example, when DJ X is selected, the selection is detected and is displayed in highlighting.

Further, on the selection screen 72 for the "Radio Mode", there are displayed, together with icons 61, 62, 63 therefor, a selection screen 72a for a "Music+Radio" mode (a mode for selecting and playing back musical pieces in between playbacks of audio content from a radio broadcast) according to an essential feature of the present invention, a selection screen 72b for an "Only Radio" mode (a mode for playing back only the audio content of a radio broadcast), and a selection screen 72c for an "Only Music" mode (a mode for selecting and playing back only musical pieces).

Within the icon (referred to as a music/radio icon) 61 of the selection screen 72a for the "Music+Radio" mode (mode for selecting and playing back musical pieces in between playbacks of audio content from a radio broadcast), a musical note icon indicative of music, and a balloon icon indicative of audio content are both displayed.

Within the icon (referred to as a radio icon) 62 of the selection screen 72b for the "Only Radio" mode (mode for playing back only audio content from a radio broadcast), only the balloon icon indicative of audio content is displayed.

Within the icon (referred to as a music icon) 63 of the selection screen 72c for the "Only Music" mode (mode for selecting and playing back only musical pieces), only the musical note icon indicative of musical pieces is displayed.

Figure 8:
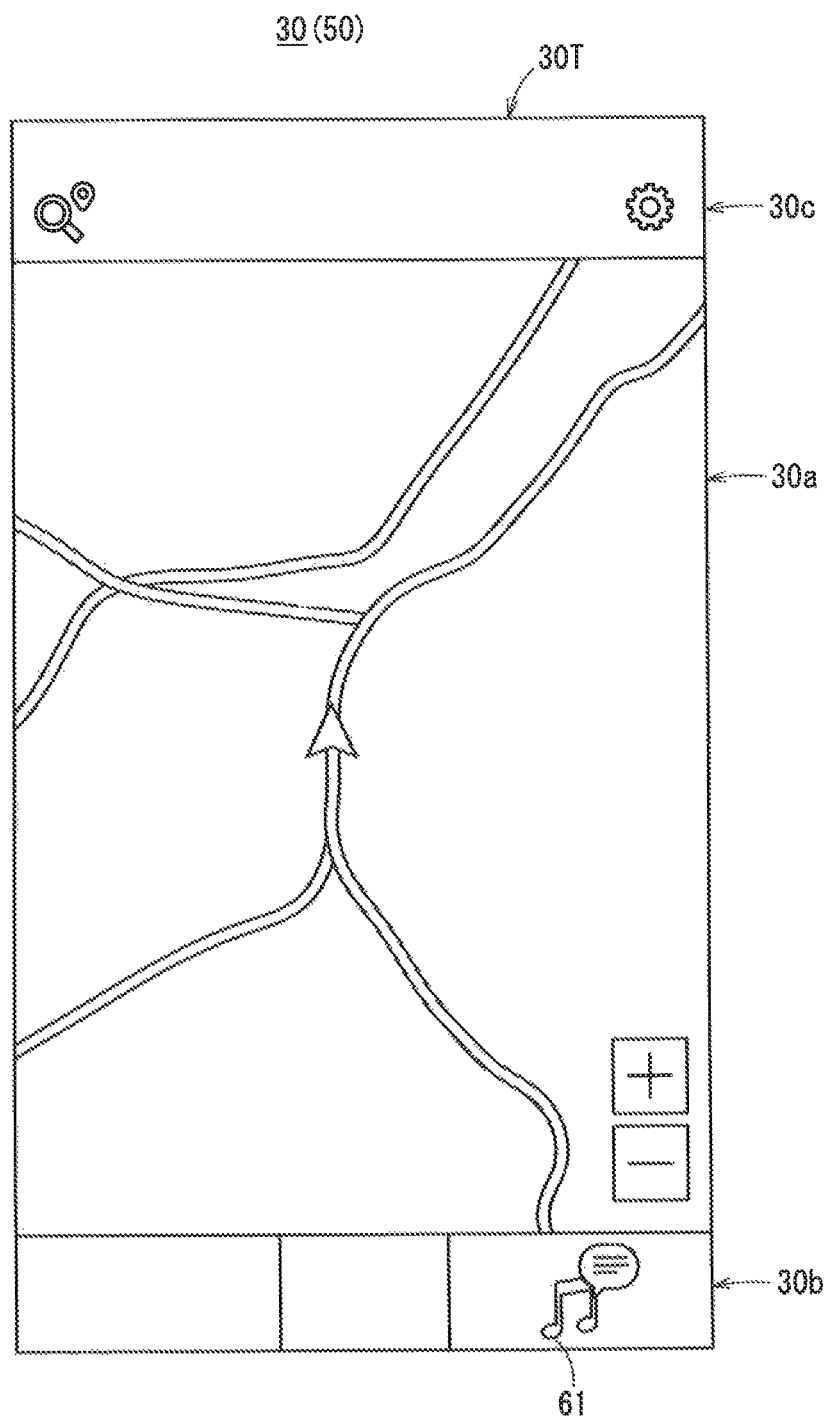
FIG. 8 is an explanatory diagram showing another top screen of a client terminal (vehicle terminal)

In step S2, when it is detected that the selection screen 72a or the accompanying icon 61 corresponding thereto for the "Music+Radio" mode (mode for selecting and playing back musical pieces in between playbacks of audio content from a radio broadcast) has been touched, then based on an operation of the vehicle-mounted operating unit 31, in step S3, a streaming distribution request (i.e., a request for streaming distribution of the audio content Ca) is implemented. At this time, as shown in FIG. 8, a different top screen 30T is displayed in which the music/radio icon 61 is displayed on the icon display screen 30b, and together therewith, a streaming distribution request signal for the audio content Ca is output to the audio content distribution unit 40 of the distribution server 10 through the Internet 26 from the audio content receiver 42 of the client terminal 12.

In step S21, by reception or non-reception of the streaming distribution request signal, the audio content distribution unit 40 of the distribution server 10 determines whether or not there is a request for streaming of the audio content Ca, and in the case of non-reception (step S21: NO), step S21 is repeated until reception occurs (step S21: YES).

In step S21, in the case that the audio content distribution unit 40 has received the streaming content request signal for the audio content Ca (step S21: YES), then in step S22, one item of audio content Ca (one program) is read out from the audio content storage unit 38, and in step S22, streaming distribution through the Internet 26 is carried out with respect to the client terminal 12 that transmitted the streaming distribution request signal.

In step S22, if streaming distribution of the one item of content Ca (one program) is completed, the process returns to step S21, and the system is placed in a standby state to wait for reception of another streaming distribution request signal.

On the other hand, in step S4, by monitoring the state of connection with the distribution server 10, the client terminal 12 monitors the condition of the distribution server 10 (refer to the server states of the selection chart 55 of FIG. 4), and determines whether or not streaming reception of the audio content Ca is possible. In the case that streaming reception thereof is impossible, the client terminal 12 identifies the server state (Excessive Traffic Load, Server trouble/Internet Trouble, Insufficient Audio Content).

In the determination of step S4, in the case that streaming reception of the audio content Ca is not impossible (step S4: NO), i.e., if the server state is "NORMAL", then in step S5, streaming playback of the audio content Ca the distribution of which was requested in step S3 is carried out.

In this case, the audio content Ca distributed from the distribution server 10 is received through the Internet 26 and the audio content receiver 42, and streaming playback thereof is performed through the playback controller 46, the communications interface 54, the communications interface 64, the playback controller 60, and the vehicle speakers 32.

In step S6, when streaming playback of the received audio content is completed, the playback controller 46 reads out from the storage unit 44 the introductory audio (introductory audio content Cga) for introducing musical pieces according to the "NORMAL" state of the server in step S7, "Coming up next, we'll be moving onto some musical pieces. Please enjoy the next two songs," and an announcement thereof is made through the vehicle speakers 32.

When the announcement is completed, then in step S8, the playback controller 46 selects two songs randomly or in a predetermined order from the storage unit 44, reads out the songs, and plays them back through the vehicle speakers 32.

After playback thereof, actually at a point in time slightly before the second song comes to an end, a streaming distribution request for new audio content Ca is carried out in step S3.

In this manner, basically, streaming playback processing of the audio content Ca, and playback processing of the musical pieces stored in the storage unit 44 of the client terminal 12 are carried out repeatedly.

The selection of audio content in accordance with streaming distribution and the number of times (frequency) that playbacks of musical pieces is repeated can be controlled by way of option settings made by the user and default settings by the distribution server 10.

On the other hand, in step S4, in the case it is determined that streaming reception of the audio content Ca is impossible (step S4: YES), then in step S9, it is further determined whether or not the judgment of reception impossibility of step S4 has been made two times or more in succession.

At first, since the judgment has been made one time, in step S10, the playback controller 46 determines that the server state, which is made clear by the communications result with the distribution server 10 (step S4 and step S21), is one of "server trouble due to excessive traffic load," "server trouble/Internet (network) trouble," or "insufficient audio content." In addition, responsive to the judgment result, any one of the following system announcements, i.e., the introductory audio (introductory audio content Cgb) "We apologize. The server is congested. Please enjoy these songs for a short time," or the introductory audio (introductory audio content Cgc) "We apologize. We're unable to connect to the server. Please enjoy these songs for a short time," or the introductory audio (introductory audio content Cgd)

"That brings to a close today's discussion. From here on out, please enjoy the following songs. We look forward to meeting with you again tomorrow. This is DJ ** signing off," is announced through the vehicle speakers 32.

When the announcement is completed, then in step S8, two songs are selected randomly or in a predetermined order from the storage unit 44, and the songs are read out and played back through the vehicle speakers 32.

After playback thereof, a streaming distribution request for new audio content Ca is carried out in step S3.

Even if the judgment of step S4 is affirmative, and the judgment of step S9 has been affirmative for two times or more in succession (step S9: YES), playback of the musical pieces inside the client terminal is carried out in step S8.

SUMMARY OF THE EMBODIMENT

As has been described above, the radio client terminal 12, 12A according to the present embodiment receives and plays back audio content of a radio broadcast from the external distribution server 10, 10A.

The radio client terminal 12, 12A is equipped with the audio content receiver 42 that receives the audio content, the storage unit 44 (musical piece storage unit) in which musical pieces preferred by the user are stored beforehand, and the playback controller 46 that selects and plays back the audio content or the musical pieces.

The playback controller 46 selects and plays back the musical pieces, which have been stored beforehand in the storage unit 44, in between playbacks of the audio content.

Figure 9:
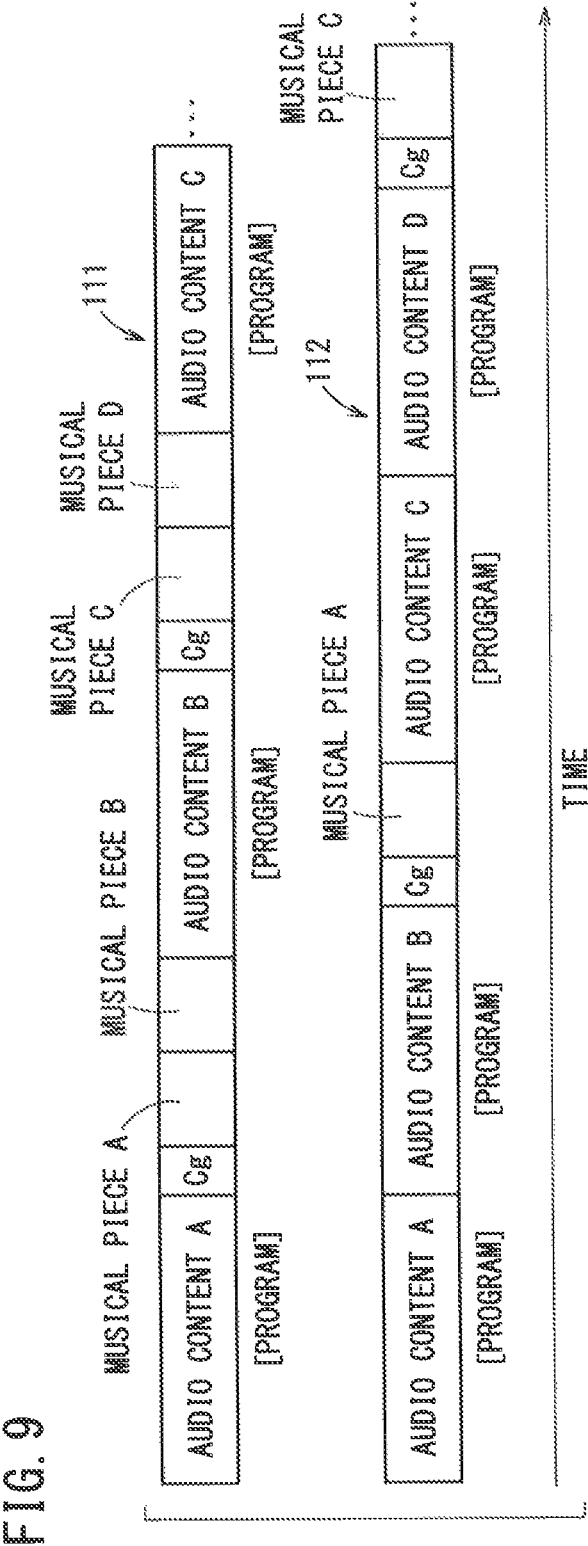
FIG. 9 is a flowchart showing a playback order sequence.

In the foregoing manner, with the radio client terminal 12, 12A according to the present embodiment, for example, as shown in a playback order sequence 111 of FIG. 9, since a configuration is provided in which (one or a plurality of) musical pieces A, B preferred by the user, which have been stored beforehand in the storage unit 44 of the radio client terminal 12, 12A, are selected, and the selected musical pieces A, B are played back following playback of introductory audio in accordance with the introductory audio content Cg, in between playbacks of audio content A and audio content B from the radio broadcast, there is no need for a license contract for distribution of the musical pieces in the radio system 16, and costs for such a license contract can be reduced. In addition, musical pieces preferred by the user can be played back at an appropriate time during reception and playback of audio content from the radio broadcast.

As shown in FIG. 9, in a playback order sequence 112 according to another example, the present invention may include a configuration in which, after a plurality of audio content items A, B have been played back, introductory content in accordance with the introductory audio content Cg and a musical piece A are played back, and thereafter, further audio content items C, D are played back.

Further, a configuration is provided in which the playback controller 46 requests streaming distribution of the audio content from the external distribution server 10, 10A (step S3), and at a time that reception and playback of the requested audio content is completed (step S4: NO→step S5→step S6), outputs the introductory audio in accordance with the introductory audio content Cg (step S7), and selects and plays back the musical pieces that have been stored beforehand in the musical piece storage unit 44 (step S8). Therefore, when reception and playback of the audio content responsive to the request (preference) of the user is completed, the musical pieces preferred by the user can be played back without fail.

Further, the playback controller 46 receives from the external distribution server 10, 10A introductory audio content Cg to be introduced into playback of the musical pieces, and selects and plays back the musical pieces that have been stored beforehand in the storage unit 44 (step S8), after having played back the introductory audio content Cg (step S7). Accordingly, in the same manner as a conventional radio broadcast, the user can listen to preferred musical pieces naturally and without any sense of discomfort.

Moreover, at a time that the audio content cannot be received, by the playback controller 46 selecting and playing back the musical pieces that have been stored beforehand in the storage unit 44, even if network trouble occurs, musical pieces preferred by the user can be played back continuously and reliably.

Further, a configuration is provided in which the storage unit 44 stores beforehand the introductory audio content Cg to be introduced into playback of the musical pieces, and when the audio content cannot be received (step S9: NO), the playback controller 46 plays back the introductory audio content Cgb, Cgc (see FIG. 4), which has been read out from the storage unit 44, into playback of the musical pieces, and thereafter, selects and plays back the musical pieces that have been stored beforehand in the storage unit 44. Therefore, the user can listen to the user's preferred musical pieces naturally and without any sense of discomfort, even at times that network trouble occurs.

A configuration can also be provided in which, when playback of the musical pieces that are stored beforehand in the storage unit 44 is completed, reception of audio content from the distribution server 10, 10A is resumed (step S8→step S3).

Further, the radio system 16 according to the present embodiment is made up from the distribution server 10, 10A that distributes audio content of the radio transmission, and the radio client terminal 12, 12A that receives and plays back the audio content. The distribution server 10, 10A is equipped with the audio content storage unit 38 that stores the audio content, and the audio content distribution unit 40 that distributes the audio content to the radio client terminal 12, 12A. The radio client terminal 12, 12A is equipped with the audio content receiver 42 that receives the audio content, the musical piece storage unit 44 in which the musical pieces are stored beforehand, and the playback controller 46 that selects and plays back the audio content or the musical pieces. The playback controller 46 selects and plays back the musical pieces that have been stored beforehand in the musical piece storage unit 44, in between playbacks of the audio content.

With the radio system 16 according to the present embodiment, since a configuration is provided in which musical pieces, which have been stored beforehand in the storage unit 44 of the radio client terminal 12, 12A, are selected, and the selected musical pieces are played back in between playbacks of audio content from the radio broadcast, there is no need for a license contract for distribution of the musical pieces in the radio system 16, and costs for such a license contract can be reduced. In addition, musical pieces preferred by the user can be played back at an appropriate time during reception and playback of audio content from the radio broadcast, and an effect is realized in that, even if network trouble occurs, musical pieces preferred by the user can be played back continuously.

If a vehicular radio system is configured such that the radio client terminal 12 according to any of the descriptions given above is connected to the vehicle terminal 14, and outputs from the vehicle speakers 32 the audio content, the introductory audio, or the musical pieces, then a user (vehicle occupant) who is a driver of the vehicle 18 or the like can view and listen to preferred musical pieces on a wider screen and with clearer audio, in comparison with a general type of radio client terminal 12.

The present invention is not limited to the embodiment described above, and it is a matter of course that various changes and modifications may be adopted based on the disclosed content of the present specification.

The invention claimed is:

1. A radio client terminal, which receives and plays back audio content of a radio broadcast from an external source, comprising:

an audio content receiver configured to receive the audio content;

a musical piece storage unit configured to store beforehand musical pieces and introductory audio content to be introduced into playback of at least one of the musical pieces; and a playback controller configured to monitor a state of connection with the external source, to select and play back a combination of the audio content and the musical pieces, and to determine the introductory audio content to be introduced into playback based on the state of connection with the external source;

wherein the playback controller is configured to select the musical piece that has been stored beforehand in the musical piece storage unit, and configured to play back the selected musical piece in between playbacks of the audio content;

wherein when the audio content cannot be received by the audio content receiver, the playback controller is configured to play back the introductory audio content, which has been read out from the musical piece storage unit, into playback of the musical piece, and thereafter, select and play back the musical piece that has been stored beforehand in the musical piece storage unit;

wherein based on a reason why the audio content cannot be received, the playback controller is configured to select and play back the introductory audio content stored in the musical piece storage unit, and after having played back the introductory audio content, the playback controller is configured to select and play back the musical piece that has been stored beforehand in the musical piece storage unit; and wherein when the audio content is insufficiently received by the audio content receiver, the introductory audio content to be introduced into playback of the at least one of the musical pieces stored in the storage unit is configured to announce to a user of the radio client terminal that the audio content is insufficiently received after distribution of the audio content is completed, and is configured to urge the user of the radio client terminal to subsequently resume reception of the radio broadcast.

2. The radio client terminal according to claim 1, wherein the playback controller is configured to receive introductory audio content to be introduced into playback of at least one of the musical pieces from the external source, and after having played back the introductory audio content, the playback controller is configured to select and play back the musical piece that has been stored beforehand in the musical piece storage unit.

3. The radio client terminal according to claim 1, wherein the playback controller is configured to request distribution of the audio content from the external source, and select and play back the musical piece that has been stored beforehand in the musical piece storage unit, at a time that reception and playback of the requested audio content is completed.

4. The radio client terminal according to claim 1, wherein reception of audio content from the external source is resumed when playback of the musical piece that has been stored beforehand in the musical piece storage unit is completed.

5. A radio system constituted from a distribution server that distributes audio content of a radio broadcast, and a radio client terminal, which receives and plays back the audio content from the radio system, wherein:
the distribution server comprises:
an audio content storage unit configured to store the audio content; and
an audio content distribution unit configured to distribute the audio content to the radio client terminal;
the radio client terminal comprises:
an audio content receiver configured to receive the audio content;
a musical piece storage unit configured to store beforehand musical pieces and introductory audio content to be introduced into playback of at least one of the musical pieces; and
a playback controller configured to monitor a state of connection with the external source, to select and play back a combination of the audio content and the musical pieces, and to determine the introductory audio content to be introduced into playback based on the state of connection with the external source;
the playback controller is configured to select the musical piece that has been stored beforehand in the musical piece storage unit, and configured to play back the selected musical piece in between playbacks of the audio content;
wherein when the audio content cannot be received by the audio content receiver, the playback controller is configured to play back the introductory audio content, which has been read out from the musical piece storage unit, into playback of the musical piece, and thereafter, select and play back the musical piece that has been stored beforehand in the musical piece storage unit;
wherein based on a reason why the audio content cannot be received, the playback controller is configured to select and play back the introductory audio content stored in the musical piece storage unit, and after having played back the introductory audio content, the playback controller is configured to select and play back the musical piece that has been stored beforehand in the musical piece storage unit; and
wherein when the audio content is insufficiently received by the audio content receiver the introductory audio content to be introduced into playback of the at least one of the musical pieces stored in the storage unit is configured to announce to a user of the radio client terminal that the audio content is insufficiently received after distribution of the audio content is completed, and is configured to urge the user of the radio client terminal to subsequently resume reception of the radio broadcast.

6. A vehicular radio system in which a radio client terminal receiving and playing back audio content of a radio broadcast from an external source, is connected to a vehicle terminal, and which outputs from a vehicle speaker the audio content or a musical piece, the radio client terminal comprising:
an audio content receiver configured to receive the audio content;
a musical piece storage unit configured to store beforehand musical pieces and introductory audio content to be introduced into playback of at least one of the musical pieces; and
a playback controller configured to monitor a state of connection with the external source, to select and play back a combination of the audio content and the musical pieces, and to determine the introductory audio content to be introduced into playback based on the state of connection with the external source;
wherein the playback controller is configured to select the musical piece that has been stored beforehand in the musical piece storage unit, and configured to play back the selected musical piece in between playbacks of the audio content;
wherein when the audio content cannot be received by the audio content receiver, the playback controller is configured to play back the introductory audio content, which has been read out from the musical piece storage unit, into playback of the musical piece, and thereafter, select and play back the musical piece that has been stored beforehand in the musical piece storage unit;
wherein based on a reason why the audio content cannot be received, the playback controller is configured to select and play back the introductory audio content stored in the musical piece storage unit, and after having played back the introductory audio content, the playback controller is configured to select and play back the musical piece that has been stored beforehand in the musical piece storage unit; and
wherein when the audio content is insufficiently received by the audio content receiver the introductory audio content to be introduced into playback of the at least one of the musical pieces stored in the storage unit is configured to announce to a user of the radio client terminal that the audio content is insufficiently received after distribution of the audio content is completed, and is configured to urge the user of the radio client terminal to subsequently resume reception of the radio broadcast.

7. The radio client terminal according to claim 1, wherein the audio content receiver is configured to receive streaming audio content.

* * * * *